(12) United States Patent
Engstrom et al.

(10) Patent No.: US 12,268,184 B2
(45) Date of Patent: Apr. 8, 2025

(54) AGRICULTURAL BUILDING ENVIRONMENTAL CONTROL SYSTEM

(71) Applicant: Diversified Agriculture, LLC, Eatontown, NJ (US)

(72) Inventors: Shawn Engstrom, Willmar, MN (US); Bradley Bowen, Gentry, AR (US); Zur Fabian, Atlanta, GA (US); Benjamin Davis, Connelly Springs, NC (US); Donald Wright, Harrington, DE (US)

(73) Assignee: Diversified Agriculture, LLC

( * ) Notice: Subject to any disclaimer, the term of this patent is extended or adjusted under 35 U.S.C. 154(b) by 142 days.

(21) Appl. No.: 18/253,578

(22) PCT Filed: Nov. 19, 2021

(86) PCT No.: PCT/US2021/060126
§ 371 (c)(1),
(2) Date: May 18, 2023

(87) PCT Pub. No.: WO2022/109293
PCT Pub. Date: May 27, 2022

(65) Prior Publication Data
US 2024/0016115 A1    Jan. 18, 2024

Related U.S. Application Data

(60) Provisional application No. 63/116,532, filed on Nov. 20, 2020, provisional application No. 63/116,514, filed on Nov. 20, 2020.

(51) Int. Cl.
*F24H 15/204*  (2022.01)
*A01K 1/00*  (2006.01)
(Continued)

(52) U.S. Cl.
CPC .......... *A01K 1/0076* (2013.01); *A01K 1/0052* (2013.01); *F24H 15/204* (2022.01);
(Continued)

(58) Field of Classification Search
CPC ... A01K 1/0076; F24H 15/204; F24H 15/238; F24H 15/242; F24H 15/254;
(Continued)

(56) References Cited

U.S. PATENT DOCUMENTS 5,044,326 A * 9/1991 Coerper ................. F23G 7/008
236/14
5,492,082 A   2/1996 Krevinghaus et al.
(Continued)

FOREIGN PATENT DOCUMENTS

GB      2091453 A      7/1982

OTHER PUBLICATIONS

International Search Report and Written Opinion dated Feb. 8, 2022 from International Application No. PCT/US2021/060126, filed Nov. 19, 2021.
(Continued)

*Primary Examiner* — Steven S Anderson, II
(74) *Attorney, Agent, or Firm* — Brian D. Kaul; Westman, Champlin & Koehler, P.A.

(57) ABSTRACT

An environmental control system for controlling environmental conditions within an open interior of an agricultural building includes a main controller, and a plurality of zone systems. Each zone system is configured to control environmental conditions within one of a plurality of zones within the open interior, and includes at least one environmental control device, a temperature sensor configured to output a temperature signal indicating a temperature within the zone, and a smart hub configured to control the at least one environmental control device of the corresponding zone
(Continued)

based on low and high setpoint temperatures for the zone issued by the main controller and the temperature signal issued by the temperature sensor of the zone. The main controller is configured to prevent activation of an environmental control device in one of the zones by the smart hub based on an operating condition of an environmental control device in another zone.

48 Claims, 8 Drawing Sheets

(51) Int. Cl.
  F24H 15/238     (2022.01)
  F24H 15/242     (2022.01)
  F24H 15/254     (2022.01)
  F24H 15/262     (2022.01)
  F24H 15/36      (2022.01)
  F24H 15/395     (2022.01)
  F24H 15/429     (2022.01)
  F24H 15/443     (2022.01)
  F24H 15/345     (2022.01)

(52) U.S. Cl.
  CPC ......... F24H 15/238 (2022.01); F24H 15/242 (2022.01); F24H 15/254 (2022.01); F24H 15/262 (2022.01); F24H 15/36 (2022.01); F24H 15/395 (2022.01); F24H 15/429 (2022.01); F24H 15/443 (2022.01); F24H 15/345 (2022.01)

(58) Field of Classification Search
  CPC ...... F24H 15/262; F24H 15/345; F24H 15/36; F24H 15/395; F24H 15/429; F24H 15/443
  See application file for complete search history.

(56) References Cited

U.S. PATENT DOCUMENTS

| | | | |
|---|---|---|---|
| 5,729,474 A | 3/1998 | Hildebrand et al. | |
| 6,666,681 B1 | 12/2003 | Do | |
| 6,938,577 B2 | 9/2005 | Kraft et al. | |
| 7,809,472 B1* | 10/2010 | Silva | F24F 11/62 236/1 C |
| 9,032,950 B2 | 5/2015 | Schultz | |
| 9,328,937 B2 | 5/2016 | Tomlinson et al. | |
| 10,346,275 B2 | 7/2019 | Fisher et al. | |
| 10,747,243 B2 | 8/2020 | Barton et al. | |
| 2003/0029925 A1 | 2/2003 | Riley et al. | |
| 2005/0234596 A1 | 10/2005 | Rietschel | |
| 2008/0134098 A1* | 6/2008 | Hoglund | F24F 11/523 715/841 |
| 2012/0312885 A1* | 12/2012 | Tomlinson | F24F 11/76 237/2 R |
| 2014/0371923 A1 | 12/2014 | Weaver et al. | |
| 2015/0369505 A1 | 12/2015 | Malve et al. | |
| 2016/0120144 A1* | 5/2016 | Kim | A01K 1/0052 119/436 |
| 2017/0136844 A1* | 5/2017 | Neu | B60H 1/3232 |
| 2018/0299151 A1 | 10/2018 | Ajax et al. | |
| 2020/0184153 A1 | 6/2020 | Bongartz et al. | |
| 2021/0339607 A1* | 11/2021 | Kaiser | F25B 49/02 |

OTHER PUBLICATIONS

International Search Report and Written Opinion dated Feb. 8, 2022 from International Application No. PCT/US2021/060128, filed Nov. 19, 2021.

D. Sklavounos, et al. "A Subspace Identification Method for Detecting Abnormal Behavior in HVAC Systems" Journal of Energy, vol. 2015, Article ID 693749, 12 pages, Hindawi Publishing Corporation (2015).

Extended European Search Report from European Application No. 21895683.7, dated Oct. 10, 2024.

SRP-Rotem SRP Hub Technical Specs, Diversified Agriculture LLC, Eatontown, NJ, Jul.-Aug. 2020, 10 pages.

VariFlame™ Heater with EDGE® Connect, Models: VF-16-EPS, VF-16-EPP, VF-16-EPG, VF-16-ENG, VF-16-ENS, VF-16-ENP, Owners Manual, PNEG-2092 Version 04, Date: Feb. 1, 2019, Copyright © 2017 by The GSI Group, LLC, 102 pages.

Zone Brooder Control Box, Instructions Manual, PNEG-801, Date: Jan. 1, 2015, Copyright © 2015 by The GSI Group, LLC, 12 pages.

* cited by examiner

AGRICULTURAL BUILDING ENVIRONMENTAL CONTROL SYSTEM

CROSS-REFERENCE TO RELATED APPLICATION

This Application is a Section 371 National Stage Application of International Application No. PCT/US2021/060126, filed Nov. 19, 2021 and published as WO 2022/109293 A1 on May 27, 2022, in English, which claims the benefit of U.S. provisional patent application Ser. No. 63/116,514, filed Nov. 20, 2020, and U.S. provisional patent application Ser. No. 63/116,532, filed Nov. 20, 2020. This Application is a Section 371 National Stage Application of International Application No. PCT/US2021/060128, filed Nov. 19, 2021 and published as WO 2022/119729 A1 on Jun. 9, 2022, in English, which claims the benefit of U.S. provisional patent application Ser. No. 63/116,514, filed Nov. 20, 2020 and U.S. provisional patent application Ser. No. 63/116,532, filed Nov. 20, 2020. The content of each of the above-identified documents is hereby incorporated by reference in its entirety.

BACKGROUND

Environmental conditions within agricultural houses, in which chickens, swine, cows, ducks, and/or other animals are controlled to maintain the health of the animals. For example, poultry houses may contain several thousands of chickens at a given time. Environmental control systems of such houses operate to provide temperature control and ventilation to prevent the build-up of ammonia, carbon dioxide, humidity, and heat within the house, which may be physiologically detrimental to the chickens. In extreme cases, improper ventilation and temperature control may lead to significant physiological stress on the housed animals that result in inhibited growth, reduced egg or milk production, disease and/or mortality.

Environmental control systems of agricultural buildings may include numerous environmental control devices, such as heaters (e.g., 30 or more) and exhaust fans. Each of the environmental control devices may include a controller for controlling the activation or deactivation of the device, such as based on temperature set points.

SUMMARY

Embodiments of the present disclosure relate to environmental control systems, zone systems, and methods for controlling environmental conditions within an open interior of an agricultural building. One embodiment of the environmental control system includes a main controller, and a plurality of zone systems, each configured to control environmental conditions within one of a plurality of zones within the open interior. Each zone system includes at least one environmental control device selected from the group consisting of a heating device and an exhaust fan, a temperature sensor configured to output a temperature signal indicating a temperature within the zone, and a smart hub configured to control the at least one environmental control device of the corresponding zone based on low and high setpoint temperatures for the zone issued by the main controller and the temperature signal issued by the temperature sensor of the zone. The main controller is configured to prevent activation of an environmental control device in one of the zones by the smart hub based on an operating condition of an environmental control device in another zone.

One embodiment relates to a method of using an environmental control system to control conditions within an open interior of an agricultural building. The environmental control system includes a main controller, and a plurality of zone systems. Each zone system is configured to control environmental conditions within one of a plurality of zones within the open interior, and includes at least one environmental control device selected from the group consisting of a heating device and an exhaust fan, a temperature sensor configured to output a temperature signal indicating a temperature within the zone, and a smart hub. In the method, environmental parameters of each zone are controlled using the corresponding zone system by receiving a low setpoint temperature and/or a high setpoint temperature for the zone from the main controller using the smart hub, and controlling the at least one environmental control device based on the temperature signal and the low setpoint temperature or the high setpoint temperature using the smart hub. The control of one of the environmental control devices of one of the zone systems is prevented based on an operating condition of one of the environmental control devices in another zone system using the main controller.

Another embodiment of an environmental control system for controlling environmental conditions of an open interior of an agricultural building includes a source of combustible gas, a main controller, a plurality of zone systems, and at least one pressure transmitter. Each zone system is configured to control environmental conditions within one of a plurality of zones within the open interior. Each zone system includes at least one heating device connected to the source of combustible gas through a supply line and configured to generate heat by burning the combustible gas when activated, a temperature sensor configured to output a temperature signal indicating a temperature within the zone, and a smart hub. The smart hub is configured to control the at least one heating device based on a setpoint temperature for the zone issued by the main controller and the temperature signal output by the temperature sensor of the zone system. Each pressure transmitter is configured to detect a pressure in the supply line and output a pressure signal. The main controller or at least one of the smart hubs deactivates one or more of the heating devices when one of the pressure signals drops below a threshold level.

Embodiments of the present disclosure also include a method of controlling environmental conditions of an open interior of an agricultural building using an environmental control system, which includes a source of combustible gas, a main controller, a plurality of zone systems, and a pressure transmitter. Each zone system is configured to control environmental conditions within one of a plurality of zones within the open interior, and includes at least one heating device, a temperature sensor, and a smart hub. Each heating device is connected to the source of combustible gas through a supply line, and is configured to generate heat by burning the combustible gas when activated. The temperature sensor is configured to output a temperature signal indicating a temperature within the zone. In the method, the at least one heating device of each zone system is controlled based on a corresponding setpoint temperature issued by the main controller and the temperature signal output by the temperature sensor of the zone system. A pressure in the supply line is detected using the pressure transmitter. One or more of the heating devices are deactivated when the detected pressure drops below a threshold level using the main controller or one of the smart hubs.

Another embodiment of an environmental control system for controlling environmental conditions of an open interior of an agricultural building includes a main controller, a plurality of zone systems, and a communication link. Each zone system is configured to control environmental conditions within one of a plurality of zones within the open interior, and includes a plurality of environmental control devices, each configured to control an environmental condition within the zone, a plurality of sensors, each configured to detect an environmental condition within the zone, and a smart hub configured to control the at least one environmental control device based on one or more parameters received from the main controller and the at least one sensor. The smart hub includes a plurality of input ports, each coupled to one of the sensors, and a plurality of input/output ports, each coupled to one of the environmental control devices. Status information on each environmental control device is communicated between the main controller and each of the smart hubs through the communication link. The status information on each environmental control device includes an identification of the environmental control device and a condition of the environmental control device.

In a method of operating an environmental control system for controlling environmental conditions of an open interior of an agricultural building, the system includes a main controller, a plurality of zone systems and a communication link. Each zone system is configured to control environmental conditions within one of a plurality of zones within the open interior, and includes a plurality of environmental control devices, a plurality of sensors, and a smart hub. The communication link is between the main controller and each of the smart hubs. In the method, environmental conditions within each zone are controlled using the corresponding zone system including receiving one or more setpoint parameters from the main controller for the zone using the smart hub, detecting environmental conditions within the zone using the sensors, and controlling the environmental control devices based on the setpoint parameters and the detected environmental conditions using the smart hub. Status information on each of the plurality of environmental control devices of each zone system is communicated to the main controller over the communication link using the smart hubs. The status information on each environmental control device includes an identification of the environmental control device and a condition of the environmental control device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
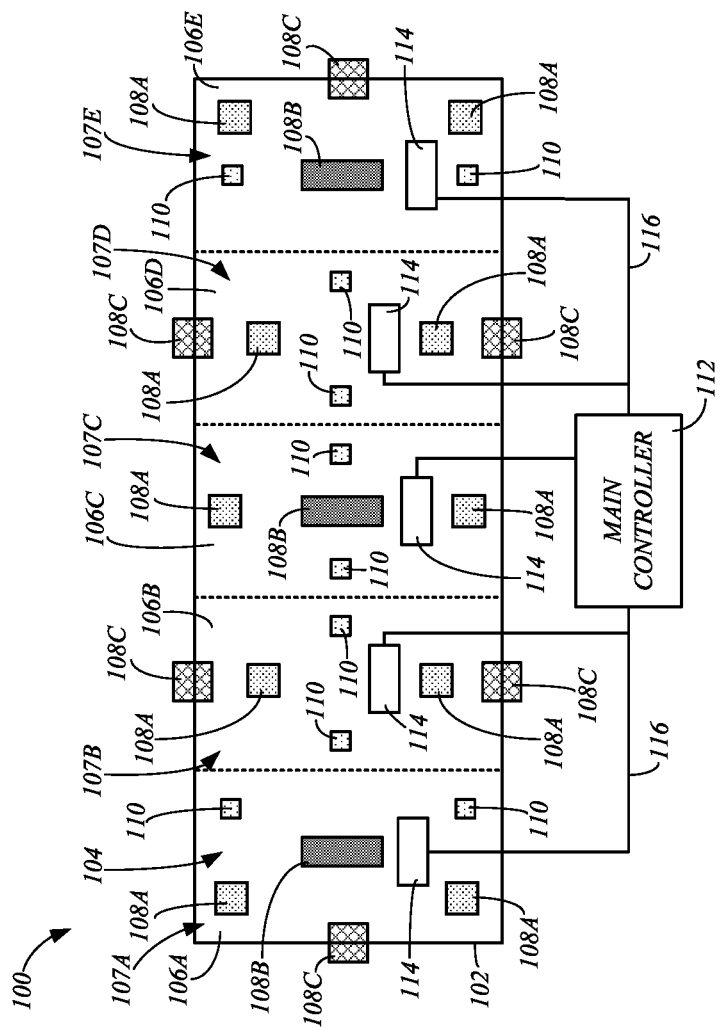
FIG. 1 is a schematic diagram of an example of an environmental control system of an agricultural building, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or may be shown in block diagram form in order to not obscure the embodiments in unnecessary detail.

Embodiments of the present disclosure relate to environmental control systems for agricultural buildings, such as animal houses (e.g., poultry houses, buildings for swine, ducks, cows, etc.), and horticulture buildings. FIG. 1 is a schematic diagram of an example of an environmental control system 100 for a large (e.g., commercial scale) agricultural building 102, in accordance with embodiments of the present disclosure. However, those skilled in the art will recognize that embodiments of the present disclosure may be used in other environments, such as other types of structures or enclosures.

The system 100 is generally configured to control environmental conditions within an open interior 104 of the building 102, in which livestock, such as chickens, swine, cows, ducks, and/or other animals, are contained, such as a poultry barn. The open interior 104 may be divided into separate zones 106, such as zones 106A-E shown in FIG. 1, as indicated by the dashed lines. Since the zones 106 are within the open interior 104, the zones 106 are not physically divided by walls or other structures that may significantly impede airflow between the zones 106. Thus, the dashed lines in FIG. 1 are only used to generally indicate a division between the zones 106, while in reality no actual division exists.

Each zone 106 includes a corresponding zone system 107 that is configured to control the environmental conditions within the zone 106. Thus, in the example system 100 shown in FIG. 1, each of the zones 106A-E includes a corresponding zone system 107A-E.

Each zone system 107 includes one or more environmental control devices, generally referred to as 108, that operate to control various environmental aspects of the interior 104. Examples of the devices 108 include zone or room heaters 108A (e.g., gas heaters, forced-air heater, electric heaters, radiant heaters, tube heaters, etc.) that are configured to heat the environment within a zone 106, brooder heaters 108B for heating brooder structures (e.g., ones containing young fowl), exhaust fans 108C for discharging air from within a zone 106 to the exterior of the building 102, and other environmental control components (e.g., circulation fans, tunnel fans, vents, tunnel doors, curtains, etc.). In some embodiments, the devices 108 are controlled based on environmental conditions detected by one or more sensors 110 (e.g., temperature sensors, humidity sensors, litter moisture sensors, etc.) distributed throughout the interior 104 and the zones 106, and indicated by output signals from the sensors 110.

In some embodiments, the system 100 includes a main controller 112, and a plurality of smart hub controllers 114 (hereinafter "smart hub"), such as one smart hub 114 for each zone system 107, as shown in FIG. 1. The main controller 112 sets environmental parameters (e.g., high setpoint temperature, low setpoint temperature, etc.) for each of the zones 106, which are communicated to the smart hubs 114. Each smart hub 114 controls the devices 108 within its zone 106 based on environmental parameters set by the main controller 112 for the zone 106, and the environmental conditions detected within the zone 106 by one or more of the sensors 110 within the zone 106.

The main controller 112 and each smart hub 114 may take on any suitable form. In one example, the main controller 112 and/or each smart hub 114 take the form of the example controller 116 shown in the simplified diagram of FIG. 2. The controller 116 may include one or more processors 118 and memory 120. The one or more processors 118 are configured to perform various functions, such as those described herein for the controller 112 and the smart hubs 114, in response to the execution of instructions contained in the memory 120. The one or more processors 118 of the controller 116 may be components of one or more computer-based systems, and may include one or more control circuits, microprocessor-based engine control systems, and/or one or more programmable hardware components, such as a field programmable gate array (FPGA). The memory 120 represents local and/or remote memory or computer readable media. Such memory comprises any suitable patent subject matter eligible computer readable media that do not include transitory waves or signals such as, for example, hard disks, CD-ROMs, optical storage devices, and/or magnetic storage devices. The controller 116 may include circuitry 122 for use by the one or more processors 118 to receive input signals 124, issue control signals 126, and or communicate data 128, such as in response to the execution of the instructions stored in the memory 120.

Figure 2:
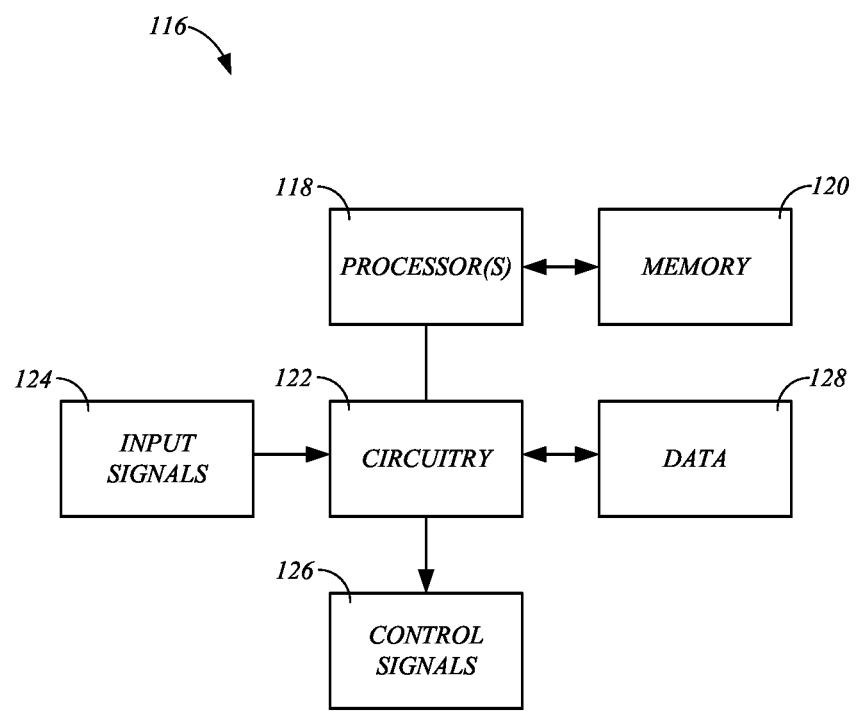
FIG. 2 is a simplified diagram of an example of a controller, in accordance with embodiments of the presented disclosure.
Figure 3:
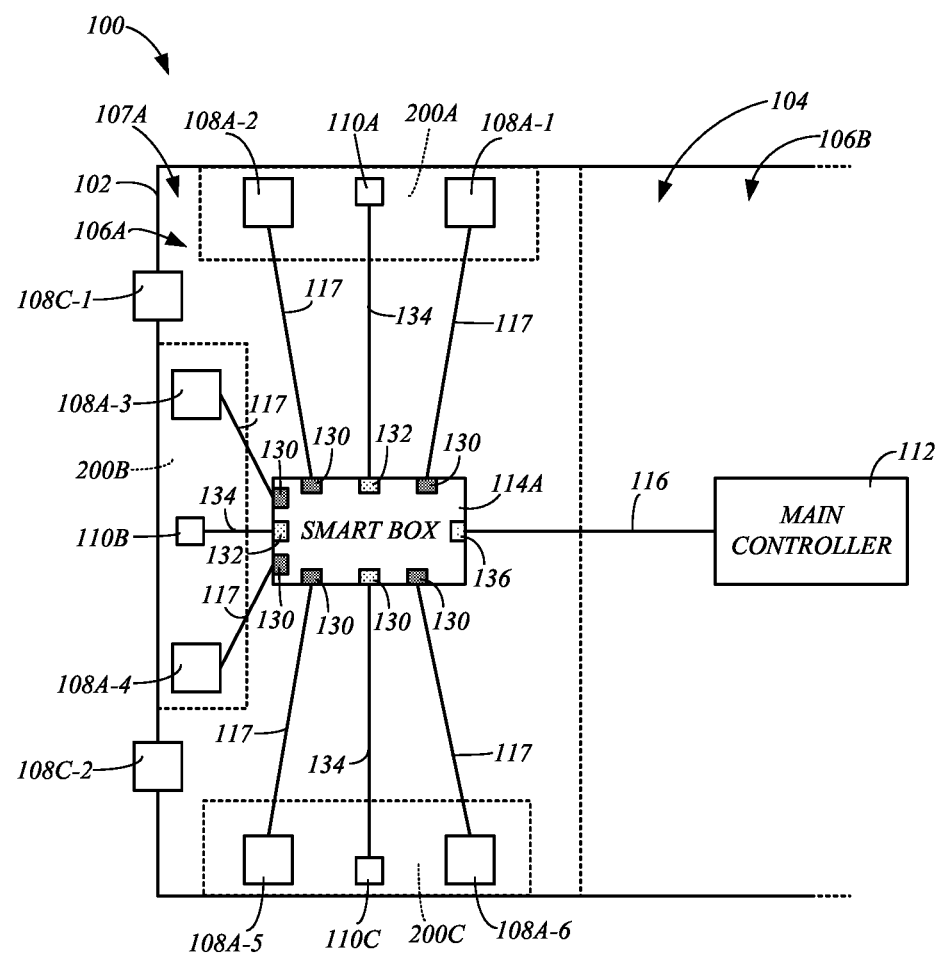
FIG. 3 is a schematic diagram illustrating portions of an environmental control system within a zone of an agricultural building, in accordance with embodiments of the present disclosure.

FIG. 3 is a schematic diagram illustrating an example of the zone system 107A of the zone 106A of FIG. 1 having zone or room heaters 108A-1, 108A-2, 108A-3, 108A-4, 108A-5 and 108A-6, temperature sensors 110A-C, and a smart hub 114A. It is understood that the example zone 106A may include a different configuration of control devices 108 and sensors 110 from that illustrated in FIG. 2, such as more or fewer zone heaters 108, or more or fewer temperature sensors 110, for example.

In operation, the main controller 112 communicates the environmental control parameters for each of the zones 106 to the corresponding smart hubs 114. Thus, the smart hub 114A in zone 106A may receive, for example, a high setpoint temperature, a low setpoint temperature, and/or other environmental parameters. The smart hub 114A then controls the devices 108 within the zone 106A based on the parameters receives from the main controller 112.

For example, the smart hub 114A may control the heaters 108A of the zone system 107A based on a low setpoint temperature received from the main controller 112 and the temperatures sensed by the sensors 110A-C to maintain the temperature within the zone 106A near the low setpoint temperature. That is, the smart hub 114A activates one or more of the heaters 108A in the zone 106A when the temperature sensed by one or more of the sensors 110 is below the low setpoint temperature, and deactivates the one or more heaters 108A when the sensed temperature is above the low setpoint temperature, such as through appropriate relays. The zone system 107A may also be configured with exhaust fans 108C-1 and 108C-2 that may be activated when the detected temperature rises above a high setpoint temperature received from the main controller 112, for example.

In some embodiments, the controller 112 communicates the environmental control parameters (e.g., control signals 126) to each smart hub 114 and receives communications (e.g., input signals 124 or data 128) from each smart hub 114 over a suitable wired or wireless communication link 116. In some embodiments, the communication link 116 is in the form of a two-wire connection, such as RS-285 or RS-485, for example. Each smart hub 114 communicates (e.g., control signals, status signals, information, etc.) with each environmental control device 108 within its zone 106 over a suitable wired or wireless communication link 117 (e.g., a two-wire connection). Each smart hub 114 may also be configured to communicate with other smart hubs 114 within the building 102 over a suitable wired or wireless connection. This reduces the overall wiring that would otherwise be required if the remotely located main controller 112 was directly wired to each of the environmental control devices 108 of the zones 106. The control parameters, signals and other information may be communicated over the communication links 116 and 117 using digital or analog communication protocols.

Some embodiments of the present disclosure are directed to performing status checks relating to the environmental control devices 108 of a given zone system 107. In one example, each smart hub 114 is configured to receive status information from each of the corresponding devices 108 within its zone 106 over the communication link 117, and communicate the status information to the main controller 112, such as over the two-wire communication link 116. The status information for a device 108 may indicate that the device 108 is operating normally, is malfunctioning, and/or has one or more specific fault conditions. Thus, the status information allows the main controller 112 to identify the zone system 107 and zone 106 having a malfunctioning device 108. Additionally, a loss of communication over the communication link 116 can also be used by the main controller 112 to identify a malfunction.

For example, the smart hub 114A may report status information to the main controller 114, which may indicate one or more of the following operating conditions of a zone heater 108A: 1) normal operation; 2) air pressure failure; 3) flame detected out of sequence; 4) ignition failure; 5) control failure; and/or other conditions of the zone heater 108A. When one or more of the devices 108 are in the form of a brooder heater 108B, the status information may indicate one or more of the following conditions: 1) normal operation; 2) flame detected out of sequence; 3) ignition failure; 4) control failure; and/or other conditions of the brooder heater 108B. The normal operation condition indicates that the heater 108A or 108B is operating normally. The air pressure failure may indicate an insufficient draft condition or a malfunction of the pressure sensor of the zone heater 108A. The flame detected out of sequence condition indicates that a flame was detected, such as by a thermocouple of the heater 108A or 108B, when it normally should not. The ignition failure condition indicates that the heater 108A or 108B did not detect ignition of the gas when expected. The control failure condition indicates that the gas heater 108A or 108B failed to ignite after activation. Other conditions of gas heaters may also be reported in the status information. These conditions may initially be detected by the heater 108A or 108B using conventional techniques, and communicated to the smart hub 114 over the communication link 117, for example.

The status information may be communicated from the smart hub 114 to the main controller 112 over the two-wire communication link 116 using digital or analog signals. In one embodiment, the status information is communicated by the smart hub 114 over the two-wire communication link 116 using voltage signals, such as 5 VDC signals. Different conditions may be indicated by a steady on or continuous voltage signal, such as a continuous 5 VDC, and a sequence of pulses of the 5 VDC signal over a specified period of time. In one embodiment, a normal operation condition of the heater 108A may be provided by the steady on or continuous signal, while different malfunctions may be indicated by distinct pulsed voltage signals.

In one example, an air pressure failure condition may be indicated by one flash of the signal over a predetermined period (e.g., 3 seconds); a flame out detected condition may be indicated by two flashes of the 5 VDC signal over the predetermined period, an ignition failure condition may be indicated by three flashes of the 5 VDC signal over the predetermined period, and a control failure signal may be indicated by four flashes of the 5 VDC signal over the predetermined period. Other flash sequences may also be used to indicate the various conditions.

Thus, the main controller 112 can receive status checks on the devices 108 within each zone system 107, which may be represented by the input signals 124 and/or the data 128 (FIG. 2). These status checks may be periodically initiated by the main controller 112, such as through the control signals 126 (FIG. 2). In some embodiments, each smart hub 114 performs status checks of one or more of the devices 108 within its zone 106 on a predetermined schedule, and automatically sends the status information to the main controller 114. In other embodiments, the smart hubs 114 perform periodic status checks on one or more of the devices 108, and transmit status information to the main controller 112 upon detection in a change in the status of one or more of the devices 108 from a previous status, or upon detection of a faulty condition. Delays may be imposed and the status checks may be repeated or cleared to avoid false alarms.

In some embodiments, the status information communicated from each smart hub 114 to the main controller 112 may include an identification of the particular environmental control device 108 to which the status information pertains. In one example, the smart hub 114 may include a plurality of device input/output ports 130, each of which may be connected to one of the environmental control devices 108 within its zone through the communication link 117, as indicated in FIG. 3. Similarly, the smart hub 114 may include sensor inputs or sensor ports 132, each of which may be connected to one of the sensors 110 over a suitable connection 134 (e.g., two-wire connection) for receiving sensor signals indicating parameters (e.g., temperature) sensed by the sensors 110, as indicated in FIG. 3. Thus, the smart hub 114 may be programmed to include an identification of a particular device 108 that is connected to a particular port 130, and/or an identification of a particular sensor 110 that is connected to a particular sensor port 132.

Accordingly, the status information received from a particular device 108, such as zone heater 108A-1 (FIG. 3), may be identified by the smart hub 114 based upon the port 130 through which the status information was received. In one embodiment, the status information transmitted to the main controller 112 from the smart hub 114 includes a unique device identification of the particular environmental control device 108 to which the status information pertains. The device identification may take on various forms. For example, the device identification may comprise a unique code for each device 108 that is communicated with the status information, an identifier of the relay that controls the activation/deactivation of the device 108, or another suitable device identification. This allows the main controller 112 to pinpoint a faulty device 108 within a zone 106 of the building 102.

When a malfunctioning device 108 is indicated by the status information, the main controller 112 or smart hub 114 may trigger an alarm, and/or a notification to an administrator of the system 100, using suitable data communications circuitry, which may be represented by the circuitry 122 (FIG. 2). The alarm may comprise an audible alarm and/or a visible alarm. The notification may comprise a short message service (SMS) or text message, an email, or other communication to a predefined address or phone number, for example. In some embodiments, the notification identifies the detected condition based on the corresponding status information.

When the status information includes the device identifier, the notification may indicate the particular device 108 having the faulty condition and/or its location within the building 102, such as the zone system 107 or zone 106 in which the device 108 is located, or the smart hub 114 to which the device 108 is connected. This information allows the administrator to locate malfunctioning devices 108 and correct detected fault conditions more quickly, as compared to when the administrator is merely notified of a fault condition within the building 102, for example.

In conventional agricultural building environmental control systems, alarms may be triggered based on detected environmental parameters, such as a temperature dropping outside of a setpoint temperature for a threshold period of time. Embodiments of the present disclosure, which trigger alarms based on detected fault conditions of the environmental control devices 108, provide significant advantages over such conventional alarm triggers.

Since the root cause of the conventional triggering of an alarm based on a detected environmental parameter may be a malfunctioning environmental control device 108, such as a zone heater 108A, there may be a significant delay from when the malfunction occurs to when an administrator is notified of the issue. For example, an alarm of a low temperature fault may be caused by a zone heater 108A malfunction, but the detection of the malfunction may be delayed several hours or days if another heater in the vicinity of the malfunctioning heater was able to compensate for the loss of heat due to the malfunction. Thus, the conventional triggering of alarms based on detected environmental conditions may delay the detection of the environmental control device malfunction that caused the alarm, and may stress other environmental control devices 108 that are forced to compensate for the malfunctioning device 108. Additionally, when heating is triggered based on an average temperature of the building, as in conventional agricultural environmental control systems, cold spots within the interior may be allowed to form without triggering activation of the heaters.

Furthermore, the environmental conditions that trigger an alarm are likely to cause unfavorable and stressful conditions for the animals. The additional delay in correcting a malfunctioning environmental control device 108 that caused the alarm, causes further delay in remedying the situation and getting the environmental conditions back to desired levels, prolonging the stress on the animals. By triggering the alarms based on an environmental control device malfunction, and informing an administrator of the malfunction, the zone system 107, the zone 106, and/or the particular device 108 that is malfunctioning, the malfunction may be remedied quickly. As a result, the period of time that environmental conditions fall outside desired parameters may be significantly reduced or avoided entirely. Accordingly, embodiments of the present disclosure can be effective in more quickly fixing environmental control device malfunctions, reducing or preventing undesired environmental conditions from occurring due to a malfunctioning environmental control device 108, and reducing animal stress due to a malfunctioning environmental control device 108.

Each smart hub 114 may also report other information (e.g., data 128) relating to its zone system 107 to the main controller 114, such as over the two-wire communication link 116. This includes the environmental parameter settings for the zone 106, current readings by the one or more sensors 110, and other information.

Figure 4:
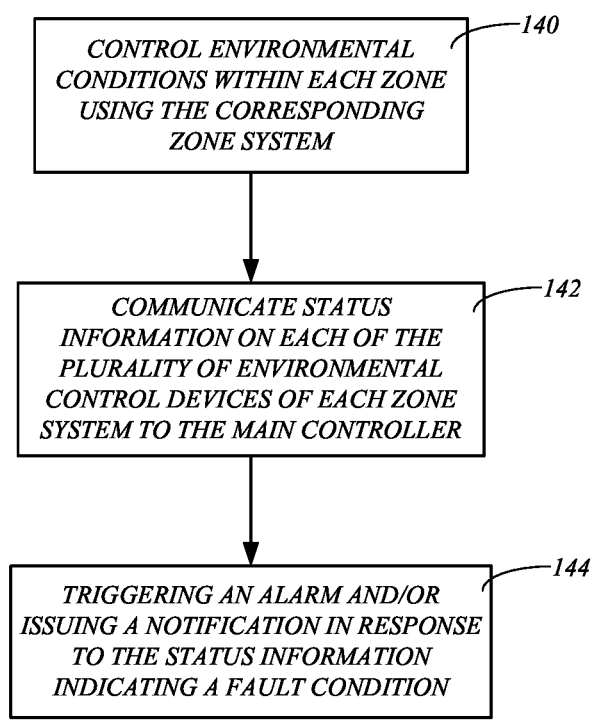
FIG. 4 is a flowchart illustrating a method of operating an environmental control system, in accordance with embodiments of the present disclosure.

Embodiments of the present disclosure include methods performed by the system 100 or components thereof, such as a method of communicating status information from the smart hubs 114 of the system 100 to the main controller 112, and methods of handling the status information. FIG. 4 is a flowchart illustrating a method of operating an environmental control system 100, formed in accordance with one or more embodiments described herein, to control environmental conditions within an open interior 104 of an agriculture building 102, in accordance with embodiments of the present disclosure.

At 140 of the method, environmental conditions within each zone 106 are controlled using the corresponding zone system 107. In one example, the smart hub 114 of each zone system 107 controls the corresponding environmental control devices 108 and monitors a status of the environmental control devices 108 within its zone 106 based on one or more environmental control parameters set by the main controller 112 and communicated over the communication link 116. This may be accomplished by control signals and status information communicated over communication links 117, for example, as illustrated in FIG. 3. Thus, in the example zone system 107A of FIG. 3, the smart hub 114A may be configured to communicate control signals over the communication links 117 to control the individual zone heaters 108A or other devices 108, such as in response to parameters received from the main controller 112 and temperature signals received from the sensors 110 over the connections 134. Additionally, the smart hub 114A may receive status information from the individual zone heaters 108A or other devices 108 over the communication links 117. The status information transmitted by the devices 108 to the smart hub 114 may indicate a normal operating condition, or one or more fault or malfunction conditions, such as those mentioned above.

At 142 of the method, status information on each of the plurality of environmental control devices 108 of each zone system 107 is communicated to the main controller 112 over the communication link 116. The status information one each environmental control device 108 includes an identification of the environmental control device 108 and a condition of the environmental control device, as discussed above. Thus, the smart hub 114 of each zone system 107 provides status updates to the main controller 112 over the communication link 116.

The status information may identify environmental conditions of the zone 106 of the zone system 107, such as a temperature of the environment, which may include an average of the temperature values indicated by the temperature sensors 110, or one or more of the temperatures sensed by the temperature sensors 110 optionally with an identification of the corresponding temperature sensor 110, for example. The status information may also include information relating to one or more of the environmental control devices 108, which, as mentioned above, may include an indicator of a current status condition of each device 108 and, optionally, an identification of the corresponding device 108, for example. The status information may also include current environmental control parameters for the zone 106, such as high and low setpoint temperatures, and/or other information.

At 144 of the method, when a smart hub 114 or the main controller 112 receives status information from one of the devices 108 that indicate a fault condition, the smart hub 114 or the main controller 112 may trigger an alarm and/or issue a notification indicting the fault condition. As discussed above, the alarm may comprise an audible or visible alarm. The notification may comprise a message to an administrator identifying the fault condition, the zone system 107 or the zone 106 in which the device 108 having the fault condition resides, and/or an identification of the particular device 108 having the fault condition. The readings from the smart hubs 114 may be used by the main controller 112 to control other devices 108, such as circulation fans, exhaust and tunnel fans, vents, tunnel doors, curtains, etc., to control various environmental conditions.

As discussed above and illustrated in FIGS. 1 and 3, large agricultural buildings 102 may include several zone heaters 108A and/or brooder heaters 108B. In some embodiments, the heaters 108A and 108B are gas heaters that optimally receive a supply of combustible gas (e.g., natural gas or propane) at a sufficient pressure to operate efficiently. In addition to reducing the efficiency of the heater, low gas pressure conditions lead to a greater amount of condensation of burned gases because the air-to-fuel ratio is too high. This condensation accumulates inside of the heat exchanger, which can lead to corrosion and a reduced lifespan of the heat exchanger. As a result, low-pressure conditions can lead to costly heater maintenance.

Figure 5:
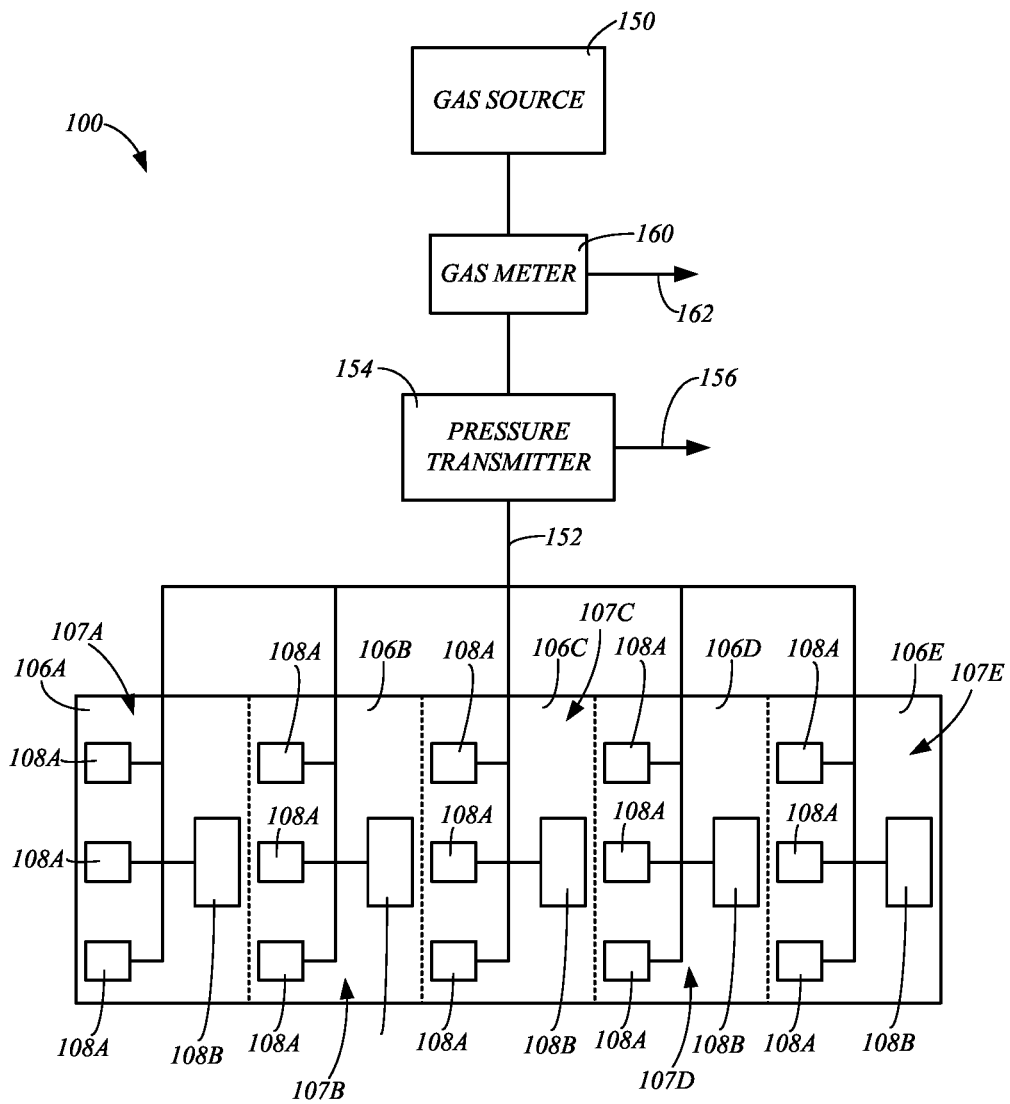
FIG. 5 is a schematic diagram of an example of an environmental control system, in accordance with embodiments of the present disclosure.

Some embodiments of the environmental control system 100 provide gas heater protection from low or zero gas pressure. FIG. 5 is a schematic diagram of an example of an agricultural building 102 having zone systems 107A-E for zones 106A-E, each of which includes multiple zone heaters 108A and a brooder heater 108B. The heaters 108A and 108B each receive gas (e.g., natural gas or propane) from a gas source 150 through a supply line 152. The gas pressure within the supply line 152 may drop below a low-pressure threshold based upon the pressure at the gas source 150, a gas leak within the supply line 152 or another location, the number of activated heaters 108A and/or 108B within the building 102, and/or another cause.

In one embodiment, the system 100 includes a pressure transmitter 154 that detects a line pressure of the supply line 152 and outputs a pressure signal 156 that is indicative of the detected pressure. The pressure transmitter 154 may comprise any suitable pressure transmitter or pressure sensor.

In some embodiments, the pressure signal 156 is transmitted to the main controller 112, or one or more of the local smart hubs 114, through a suitable wired or wireless connection. If the pressure signal 156 is provided to the smart hub 114, the smart hub 114 may then relay the pressure signal 156 or a pressure value indicated by the pressure signal 156 to the main controller 112 through the communication link 116 (FIGS. 1 and 3), for example.

Figure 6:
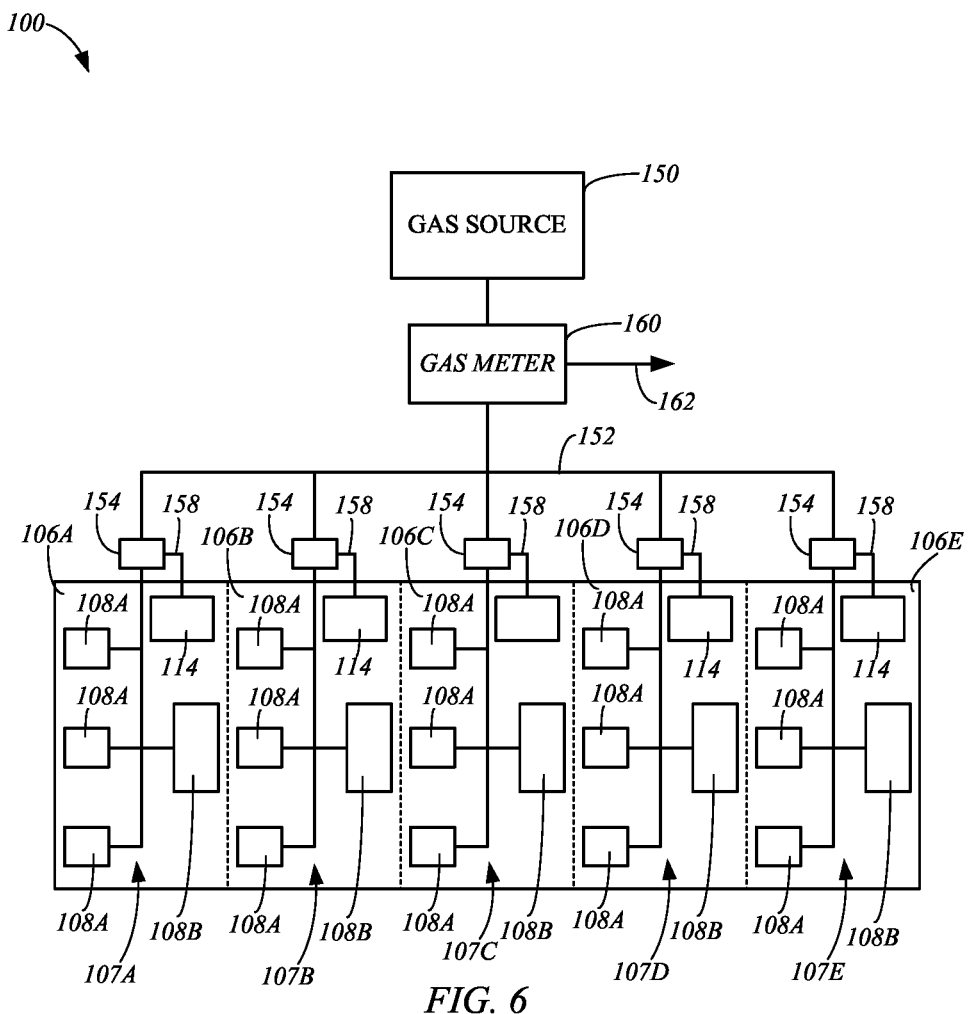
FIG. 6 is a schematic diagram of an example of an environmental control system, in accordance with embodiments of the present disclosure.

In some embodiments, the system 100 includes multiple pressure transmitters 154, such as one for each zone system 107, as illustrated in the schematic diagram of FIG. 6. Here, each pressure transmitter 154 communicates a pressure signal that is indicative of the line pressure to the heaters 108A and/or 108B to the smart hub 114 of the corresponding zone system 107 over a suitable wired or wireless communication link 158. In one embodiment, a wired communication link 158 is established between the pressure transmitter 154 and the smart hub 114 of each zone system 107, and the smart hub 114 relays the pressure signal from the transmitter 154, or the value indicated by the pressure signal, to the main controller 112 over the communication link 116 (FIG. 1).

In one embodiment, an alarm and/or notification may be automatically triggered when the pressure indicated by the pressure signal 156 drops below a threshold level, such as a low-pressure threshold value, which may be stored in memory of the system 100, such as memory 120 (FIG. 2) of the main controller 112 or the smart hub 114. Thus, a comparison is performed between a detected pressure indicated by the pressure signal 156 and a low-pressure threshold by either the main controller 112 or one of the smart hubs 114. When the detected pressure drops below the low-pressure threshold, the alarm and/or notification may be triggered by the main controller 112 and/or at least one of the smart hubs 114. The alarm and notification may take on the forms discussed above with regard to the alarm and notification for an environmental control device malfunction.

In one embodiment, one or more of the heaters 108A and/or 108B are deactivated when the pressure indicated by the pressure signal 156 drops below a threshold value. This may be performed by an administrator of the system 100, such as in response to the alarm or notification, or automatically performed by the main controller 112 or the local smart hub 114.

When each zone system 107 includes a corresponding pressure transmitter 154, the main controller 112 or the smart hub 114 of a zone 106 may deactivate one or more of the heaters 108A and/or 108B within the zone 106 when the pressure signal 156 indicates a pressure value that is below a low-pressure threshold for the zone 106. The low-pressure thresholds for each zone system 107 or zone 106 may be different from each other. In some embodiments, each zone 106 has a corresponding low-pressure threshold that is set based on the number of heaters 108A and/or 108B that are within the zone 106, or other parameters. For example, a zone 106 having more heaters 108A and/or 108B may have a higher low-pressure threshold than zones 106 having fewer heaters 108A and/or 108B.

In some embodiments, the deactivation of one or more of the heaters 108A and/or 108B comprises the deactivation of: all of the heaters 108A and/or 108B of the building 102; all of the heaters 108A and/or 108B of one or more of the zone systems 107; a subset of the heaters 108A and/or 108B of the building 102; or a subset of the heaters 108A and/or 108B of a zone system 107. For example, the detection of a low-pressure condition within a zone system 107 by the corresponding smart hub 114 or the main controller 112 may trigger the deactivation of all of the heaters 108A and/or 108B within the zone system 107, or the deactivation of a subset of the heaters 108A and/or 108B within the zone system 107. The particular subset of the heaters 108A and/or 108B that are deactivated may be predefined in the system program.

After the deactivation of one or more of the heaters 108A and/or 108B, the main controller 112 or one or more of the smart hubs 114 may perform a second pressure check of gas pressure to a particular zone 106 or the supply line 152 using one of the pressure transmitters 154 to determine whether the low-pressure reading was remedied by the deactivation of one or more of the heaters 108A and/or 108B by performing the comparison of the detected pressure to the corresponding low-pressure threshold. If the low-pressure reading is not remedied, the main controller 112 and/or one or more of the smart hubs 114 may deactivate more of the heaters 108A and/or 108B, and perform another pressure check. This process may continue until the detected pressure satisfies the low-pressure threshold.

In one embodiment, the system includes a gas meter 160, as indicated in FIGS. 5 and 6. The gas meter is configured to output a flow rate signal 162 that is indicative of a volumetric flow rate of the gas flowing from the gas source 150 through the supply line 152 and to the zone systems 107.

The system 100 may include gas usage information that relates gas usage (e.g., volumetric gas flow rates) to outdoor environmental conditions based on historical data, and/or to the number of gas heating devices (e.g., 108A and 108B) that are activated. Such gas usage information may be stored in memory 120 of the main controller 112 as a mapping of gas usage to outdoor weather conditions (e.g., temperature, sunny or cloudy, etc.) and/or activated heating devices 108A and 108B, for example. The gas usage information may be accessed by the main controller 112 and used to determine an expected flow rate of the gas for the system 100 based on the outdoor weather conditions.

In some embodiments, the main controller 112 may be configured to receive current outdoor weather conditions (e.g., temperature, sunny or cloudy, etc.) from a suitable source, such as an outdoor temperature sensor, a weather application or internet source, or another suitable source. Alternatively, or in addition, the main controller 112 may receive activation information from the smart hubs 114 of the zone systems 107 indicating the number of active heating devices 108A and 108B. In one embodiment, the controller 112 accesses the gas usage information (e.g., mapping) and identifies the expected flow rate of the gas based on the current weather conditions and/or activated heating devices 108A and 108B, and compares the expected flow rate to the flow rate measured by the gas meter 160 and indicated by the flow rate signal 162. In one embodiment, the main controller 112 triggers an alarm and/or a notification when the measured flow rate indicated by the flow rate signal 162 exceeds the expected flow rate for the current weather conditions, which may indicate a gas leak. The alarm and notification may be similar to those described above.

Figure 7:
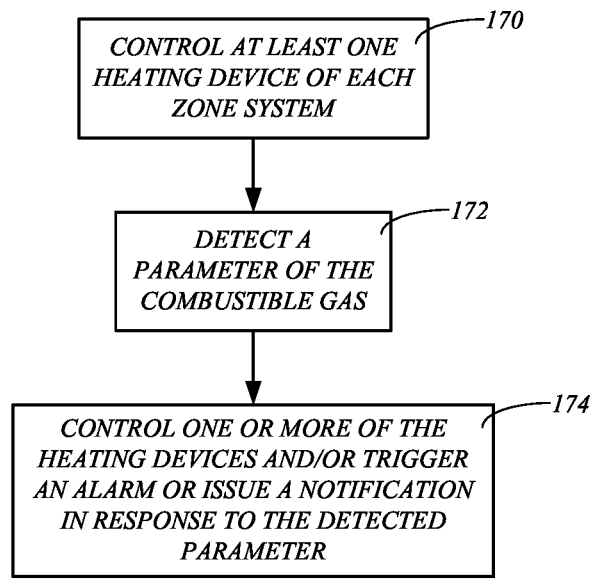
FIG. 7 is a flowchart illustrating an example of a method of controlling environmental conditions of an open interior of an agricultural building using an environmental control system, in accordance with embodiments of the present disclosure.

FIG. 7 is a flowchart illustrating an example of a method of controlling environmental conditions of an open interior 104 of an agricultural building 102 using an environmental control system 100, in accordance with embodiments of the present disclosure. Embodiments of the method utilize the system 100 formed in accordance with one or more embodiments described herein, such as those including one or more pressure transmitters 154 and/or a gas meter 160.

At 170 of the method, at least one heating device, such as a heating device 108A or 108B (FIGS. 5 and 6) of each zone system 107 are controlled (e.g., activated and deactivated) to control a temperature within the corresponding zone 106. In one example, this involves controlling the heating devices 108A or 108B of each zone system 107 based on corresponding setpoint temperatures issued by the main controller 112 and a temperature signal output by a temperature sensor 110 (FIG. 3) of the zone system 107.

At 172 of the method, a parameter of the combustible gas is detected. In one embodiment, a pressure of the combustible gas in the supply line 152 is detected based on the pressure signal or signals 156 issued by one or more pressure transmitters 154 (FIGS. 5 and 6) of the system 100. In another embodiment, a flow rate of the combustible gas in the supply line 152 is detected using the gas meter 160 (FIGS. 5 and 6). Method step 172 may include a combination of these embodiments, such that the pressure and flow rate are each detected.

At 174 of the method, one or more of the heating devices are controlled and/or an alarm is triggered or a notification is issued, in response to the detecting step 172. In one example, one or more of the heating devices 108A or 108B are deactivated when the detected pressure in step 172 drops below a threshold level using the main controller 112, as discussed above. In another example, an alarm is triggered and/or a notification is issued when the flow rate detected in step 172 exceeds the expected flow rate, as discussed above.

In some embodiments, the smart hubs 114 operate to control their zones 106 independently based on the environmental control parameters set by the main controller 112. Thus, once the smart hubs 114 receive one or more environmental control parameters from the main controller 112, they will operate to control the environment within their zones 106 accordingly, even if communication with the main controller 112 is lost. For example, if the smart hub 114A of the zone system 170A controlling zone 106A is instructed to maintain the temperature above a low setpoint temperature and/or below a high setpoint temperature received from the main controller 112 at an input/output port 136 (FIG. 3), the smart hub 114A will continue to control the heating devices 108A to maintain the temperature within the zone 106A in accordance with these last-received setpoint parameters, even if the smart hub 114A loses communication with the main controller 112 over the communication link 116, such as due to a power loss (e.g., from a lightning strike), a malfunction of the main controller 112, or another issue. Thus, when the smart hub 114 detects a loss of signal or an invalid signal through the communication link 116 at the port 136, the smart hub 114 will continue to operate in accordance with the last-received environmental parameters issued by the main controller 112.

Figure 8:
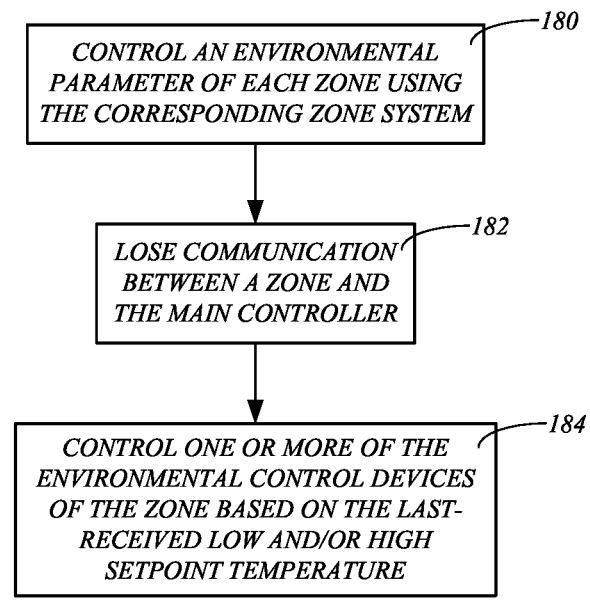
FIG. 8 is a flowchart illustrating an example of a method of controlling environmental conditions of an open interior of an agriculture building using an environmental control system, in accordance with embodiments of the present disclosure.

FIG. 8 is a flowchart illustrating an example of a method of controlling environmental conditions of an open interior 104 of an agriculture building 102 using an environmental control system 100, in accordance with embodiments of the present disclosure. Embodiments of the method utilize the system 100 formed in accordance with one or more embodiments described herein. In one example, the system 100 includes a main controller 112 and a plurality of zone systems 107 that are each configured to control environmental conditions (e.g., temperature) within one of the zones 106 within the open interior 104. Each zone 107 may include at least one environmental control device 108 selected from the group consisting of a heating device 108A and 108B, and an exhaust fan 108C, a temperature sensor 110 configured to output a temperature signal indicating a temperature within the zone 106, and a smart hub 114, such as described above with respect to FIGS. 1-3.

At 180 of the method, an environmental parameter (e.g., temperature) of each zone 106 is controlled using the corresponding zone system 107. In one embodiment, this involves each zone system 107 periodically receiving a low setpoint temperature and/or a high setpoint temperature from the main controller 112, and controlling the at least one environmental control device 180 of each zone 107 based on the temperature signal output from the temperature sensor 110 of the zone 106 in response to the received low and/or high setpoint temperature. The communication of the setpoint temperatures between the main controller 112 and the smart hubs 114 may be made over the communication link 116 (FIGS. 1 and 3), as discussed above.

At 182 of the method, communication is lost between one of the zone systems 107, such as the smart hub 114 of the zone system 107, and the main controller 114. This loss of communication over the link 116 may occur for various reasons, such as a malfunction of the main controller 112, a malfunctioning relay, a lightning strike, or another reason. As a result, one of the zone systems 107 does not receive an update to the environmental parameters that are to be used by the zone system 107 to control the environmental control devices 108 of the zone system 107.

At 184 of the method, the zone system 107 that lost communication with the main controller 114, controls one or more of its environmental control devices 108 based on the temperature signal output from its temperature sensor 110, and the low and/or high setpoint temperature that was received from the main controller 112 prior to loosing communication with the main controller 112. Thus, the zone 107 uses the last-received low and/or high setpoint temperature to control its devices 108. This allows the zone system 107 to continue to operate, and prevents the environmental conditions within the corresponding zone 106 to move to undesirable levels in the event of a communications failure. As a result, each zone system 107 may operate as a backup to the main controller 112.

In other embodiments, the environmental control devices 108 in one zone system 107 are controlled based on an operating state or control of the devices 108 in one or more of the other zone systems 107 within the building 102. The operating states of the environmental control devices 108 in one zone system 107 that may affect the operation of the devices 108 in a different zone system 107 include, the activation of one or more of the heating devices 108A or 108B, and/or the activation of one or more exhaust fans 108C. For example, when the temperature in the zone 106B measured by one or more of the sensors 110 indicates that one or more of the zone heaters 108A should be activated by the corresponding smart hub 114B, the smart hub 114B may delay the activation of the heaters 108A when one or more of the exhaust fans 108C in one of the adjoining zones 106A or 106C are operating to reduce the temperature or humidity in the zones 106A or 106C. As a result, the system 100 avoids exhausting air through the exhaust fans 108C of zones 106A or 106B that was recently heated within the zone 106B and has yet to "pick-up" moisture from the interior 104 of the building 102 or mix with cooler air within the interior 104. Thus, this operation of the system 100 conserves gas and heat energy.

The main controller 112 may perform the contingency based control of the devices 108 within the system 100 by limiting permissions of each smart hub 114 regarding the control of the devices 108 within its zone 106 based upon the operational states or conditions of the devices 108 in the adjoining zones 106.

Similarly, the main controller 112 may perform contingency based control of the devices 108 within a zone system 107. In some embodiments, the controller 112 limits the control of the devices 108 within a zone system 107 based on the operating conditions of the other devices 108 within the zone 106. For example, if the smart hub 114 has activated one or more of the heaters 108A within its zone 106, the main controller 112 may remove permissions for the smart hub 114 to activate the exhaust fans 108C within its zone, and vice versa.

The system 100 may facilitate the contingent control of the devices 108 within the system 100 using various techniques. In one embodiment, each of the smart hubs 114 may communicate a current operational condition or state of one or more of the environmental control devices 108 in its zone 106 to the main controller 112, and the main controller 112 grants device control permissions to the smart hubs 114 based on the operational conditions or states of the devices 108 in other zones.

Thus, in one example, if the smart hub 114 of the zone system 107A activates one or more of its exhaust fans 108C due to a temperature reading by a temperature sensor 110 that is above a temperature setpoint or a humidity reading by a humidity sensor 110 that is above a humidity setpoint for the zone 106A, the smart hub 114 communicates the activation of the one or more exhaust fans 108C to the main controller 112. The main controller 112 then adjusts the device control permissions for the smart hubs 114 in one or more of the other zone systems 107 to avoid conflicting environmental control operations. For example, when an exhaust fan 108C in zone 106A has been activated, the main controller 112 may adjust the permissions of the adjoining zone system 107B to prevent the smart hub 114 in the zone 106B from activating one or more of the zone heaters 108A in response to a temperature reading by a temperature sensor 110 that the temperature within the zone 106B is below a setpoint temperature, to avoid wasting gas and heat energy.

In another example, the sensors 110 may include one or more litter moisture sensors, which detect moisture or a moisture level in litter applied to the floor of the interior 104 or the floor of a zone 106. Here, the main controller 112 may override the smart hub's 114 control of its heating devices 108A based on the detected litter moisture to assist in controlling the moisture in the litter. For instance, the main controller 112 may prevent the deactivation of one or more heating devices 108A (e.g., radiant heaters) in a zone 106 by the corresponding smart hub 114 when the detected litter moisture is above a threshold even though the temperature within the zone 106 indicated by the temperature sensors 110 calls for the deactivation of the heating devices 108, in order to enhance the drying of the litter within the zone 106. The control permissions that prevent the smart hub 114 of the zone system 107 from deactivating the heating devices 108A may be removed after a predetermined period of time, after the detected moisture drops below a threshold, and/or after the temperature within the zone 106 reaches a secondary threshold limit. The main controller 112 may also override a smart hub's 114 control its heating devices to prevent their activation when the detected temperature calls for their activation, such as when the detected humidity of the air within the zone 106 is high, for example.

Figure 9:
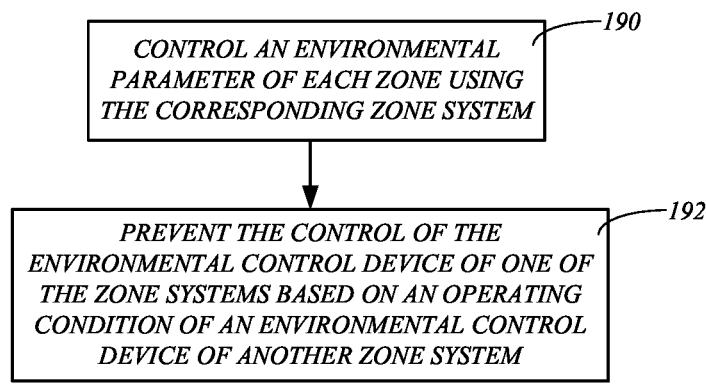
FIG. 9 is a flowchart illustrating an example of a method of controlling environmental conditions of an open interior of an agriculture building using an environmental control system, in accordance with embodiments of the present disclosure.

FIG. 9 is a flowchart illustrating an example of a method of controlling environmental conditions of an open interior 104 of an agriculture building 102 using an environmental control system 100, in accordance with embodiments of the present disclosure. Embodiments of the method utilize the system 100 formed in accordance with one or more embodiments described herein. In one example, the system 100 includes a main controller 112 and a plurality of zone systems 107 that are each configured to control environmental conditions (e.g., temperature) within one of the zones 106 within the open interior 104. Each zone 107 may include at least one environmental control device 108 selected from the group consisting of a heating device 108A and 108B, and an exhaust fan 108C, a temperature sensor 110 configured to output a temperature signal indicating a temperature within the zone 106, and a smart hub 114, such as described above with respect to FIGS. 1-3.

At 190 of the method, an environmental parameter (e.g., temperature) of each zone 106 is controlled using the corresponding zone system 107. In one embodiment, this involves each smart hub 114 receiving a low setpoint temperature and/or a high setpoint temperature from the main controller 112, and controlling the at least one environmental control device 180 of each zone 107 based on the temperature signal output from the temperature sensor 110 of the zone 106 in response to the received low and/or high setpoint temperature. The communication of the setpoint temperatures between the main controller 112 and the smart hubs 114 may be made over the communication link 116 (FIGS. 1 and 3), as discussed above.

At 192 of the method, control of the at least one of the environmental control devices 108 (e.g., heating device 108A or 108B, exhaust fan 108C, etc.) of one zone system 107 is prevented, using the main controller 112, based on an operating condition of one of the environmental control devices 108 (e.g., heating device 108A or 108B, exhaust fan 108C, etc.) of another zone system 107, such as discussed above.

In some embodiments, each zone 106 is divided into multiple sub-zones 200, each having one or more zone heaters 108A and one or more temperature sensors 110. For example, the zone 106A shown in FIG. 3 may be divided into sub-zones 200A, 200B and 200C. The sub-zone 200A includes heaters 108A-1 and 108A-2, and the temperature sensor 110A; the sub-zone 200B includes heaters 108A-3 and 108A-4, and the temperature sensor 110B; and the sub-zone 200C includes heaters 108A-5 and 108A-6, and the temperature sensor 110C. The smart hub 114A may control the heaters 108A in each sub-zone 200 based on the temperature values sensed by the temperature sensors 110 of the zone 106A (e.g., average of the temperature values) to maintain the zone 106a above a low setpoint temperature set by the main controller 112.

In one embodiment, the smart hub 114A controls the heaters 108A within a sub-zone 200 based on a temperature value or values sensed by the one or more temperature sensors 110 within the sub-zone 200 to maintain the sub-zone 200 above a low setpoint temperature. This independent control of the heating of each sub-zone 200 by the smart hub 114 allows for targeted heating of areas of the zone 106 that require heat while avoiding the heating of areas that do not require heat, resulting in more uniform heating of the zone 106 relative to systems that trigger the activation of all of the heaters within a zone 106 based on a sensed temperature within the zone 106.

For example, if the sub-zone 200A includes an exterior wall that is exposed to strong sunlight and the sub-zone 200C is shaded and/or exposed to windy conditions, the temperature sensors 110A and 110B of the sub-zones 200A and 200B may each sense a temperature that is above the low setpoint temperature assigned to the zone 106A by the main controller 112, while the temperature sensor 110C of the sub-zone 200C may sense a temperature that is below the low setpoint temperature for the zone 106A. In that case, the smart hub 114 may keep the heaters 108A-1 and 108A-2 deactivated, while activating the heater 108A-5 and/or the heater 108A-6 to heat the sub-zone 200C until the temperature sensed by the sensor 110C reaches or exceeds the low setpoint temperature. As a result, overheating of the sub-zones 200A and 200B may be avoided, while only heating the area requiring heat. As a result, the zone 106A may be heated more efficiently and uniformly.

As discussed above, some embodiments of the system 100 utilize two or more temperature sensors 110 in each zone 106, as shown in FIGS. 1 and 3, or each sub-zone 200. In the event that there is a loss of signal to the smart hub 114 from one of the temperature sensors 110, such as at one of the ports 132 (FIG. 3), one embodiment of the smart hub 114 calculates an average temperature of the zone 106 based on an average of the temperature values sensed by the remaining temperature sensors 110 within the zone 106, and controls the activation/deactivation of one or more of the zone heaters 108A based on the calculated average temperature.

Thus, a smart hub 114 of a zone system 107 may include a first operating mode, in which the smart hub 114 controls one of the heating devices 108A of its zone based on the temperature signals received from a first subset of the temperature sensors 110, and a second operating mode, in which the smart hub 114 controls the same heating device 108A based on the temperature signals received from a second subset of the temperature sensors 110 that is different from the first subset. As a result, the smart hub 114 is able to continue to control the environmental conditions within its zone 106 in the event of a temperature sensor 110 malfunction or loss of signal.

Figure 10:
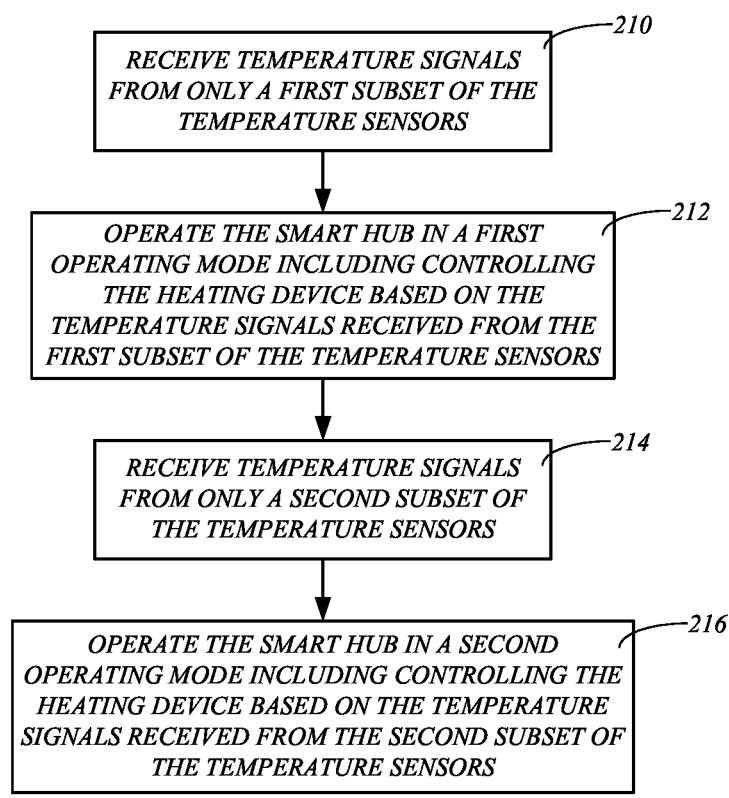
FIG. 10 is a flowchart illustrating a method of controlling environmental conditions within a zone of an open interior of an agricultural building, in accordance with embodiments of the present disclosure.

An example of a method in accordance with this embodiment will be described with reference to the flowchart of FIG. 10. At 210 of the method, temperature signals are received from only a first subset of the temperature sensors 110 of the zone system 107. For example, the smart hub 114A of the zone system 107A may receive temperature signals from the temperature sensors 110A, 110B and 110C, and may control the operation of the heating devices 108A-1 and/or 108A-2 based on only on the temperature signal received from the temperature sensor 110A, or the temperature signals from the temperature sensors 110A, 110B and 110C, for example. Thus, the first subset of the temperature sensors 110A-C may be the temperature sensor 110A or the temperature sensors 110A-C, for example.

At 212 of the method, the smart hub operates in a first operating mode, in which the heating device is controlled based on the received temperature signals from the first subset of the temperature sensors 110. Accordingly, in the example mentioned above, the smart hub 114A may control the operation of the heating device 108A-1 and/or 108A-2 based on the temperature signals received from the temperature sensor 110A, or the temperature sensors 110A-C, that comprise the first subset of the temperature sensors 110.

At 214 of the method, temperature signals are received from only a second subset of the temperature sensors 110 of the zone system 107 that is different from the first subset. The smart hub 114 then operates in a second operating mode that includes controlling the heating device 108A based on the received temperature signals from the second subset of temperature sensors 110, as indicated at 216 of the method.

Thus, continuing with the example discussed above, the smart hub 114A of the zone system 107A may only receive temperature signals from the temperature sensors 110B and 110C, and does not receive a temperature signal from the temperature sensor 110A. As a result, the smart hub 114A only receives temperature signals from a second subset of the temperature sensors 110 of the zone, which may comprise the temperature signals from both of the temperature sensors 110B and 110C, or the temperature signal from the temperature sensor 110B or 110C, for example. The smart hub 114A then controls the heating device 108A-1 and/or 108A-2 based on the temperature signals received from the second subset of the temperature sensors 110.

Although the embodiments of the present disclosure have been described with reference to preferred embodiments, workers skilled in the art will recognize that changes may be made in form and detail without departing from the spirit and scope of the present disclosure.

What is claimed is:

1. An environmental control system for controlling environmental conditions of an open interior of an agricultural building, the system comprising:
   a main controller; and
   a plurality of zone systems, each configured to control environmental conditions within one of a plurality of zones within the open interior, each zone system comprising:
      at least one environmental control device selected from the group consisting of a heating device and an exhaust fan;
      a temperature sensor configured to output a temperature signal indicating a temperature within the zone; and
      a smart hub configured to control the at least one environmental control device of the corresponding zone based on low and high setpoint temperatures for the zone issued by the main controller and the temperature signal issued by the temperature sensor of the zone;
   wherein the main controller is configured to prevent activation of an environmental control device in one of the zones by the smart hub based on an operating condition of an environmental control device in another zone.

2. The environmental control system of claim 1, wherein: the plurality of zone systems includes:

a first zone system configured to control environmental conditions within a first zone of the plurality of zones, the first zone system including an exhaust fan; and a second zone system configured to control environmental conditions within a second zone of the plurality of zones, the second zone system including a heating device; and the main controller is configured to prevent the smart hub of the second zone system from activating the heating device when the exhaust fan of the first zone system is activated.

3. The environmental control system of claim 2, wherein the first zone adjoins the second zone within the open interior.

4. A method of controlling environmental conditions within an open interior of an agricultural building using an environmental control system, which includes:
   a main controller; and
   a plurality of zone systems, each zone system configured to control environmental conditions within one of a plurality of zones within the open interior, each zone system comprising:
      at least one environmental control device selected from the group consisting of a heating device and an exhaust fan;
      a temperature sensor configured to output a temperature signal indicating a temperature within the zone; and
      a smart hub;
the method comprising:
   controlling environmental parameters of each zone using the corresponding zone system comprising:
      receiving a low setpoint temperature and/or a high setpoint temperature for the zone from the main controller using the smart hub; and
      controlling the at least one environmental control device based on the temperature signal and the low setpoint temperature or the high setpoint temperature using the smart hub; and
   preventing controlling of one of the environmental control devices of one of the zone systems based on an operating condition of one of the environmental control devices in another zone system using the main controller.

5. The method of claim 4, wherein:
the plurality of zone systems includes:
   a first zone system configured to control environmental conditions within a first zone of the plurality of zones, the first zone system including an exhaust fan; and
   a second zone system configured to control environmental conditions within a second zone of the plurality of zones, the second zone system including a heating device; and
preventing controlling of the at least one environmental control device comprises preventing the smart hub of the second zone system from activating the heating device when the exhaust fan of the first zone system is activated.

6. The method of claim 4, wherein:
the plurality of zone systems includes:
   a first zone system configured to control environmental conditions within a first zone of the plurality of zones, the first zone system including an exhaust fan; and a second zone system configured to control environmental conditions within a second zone of the plurality of zones, the second zone system including a heating device; and preventing controlling of the at least one environmental control device comprises preventing the smart hub of the first zone system from activating the exhaust fan when the heating device of the second zone system is activated.

7. An environmental control system for controlling environmental conditions of an open interior of an agricultural building, the system comprising:
   a source of combustible gas;
   a main controller;
   a plurality of zone systems, each configured to control environmental conditions within one of a plurality of zones within the open interior, each zone system comprising:
      at least one heating device connected to the source of combustible gas through a supply line and configured to generate heat by burning the combustible gas when activated;
      a temperature sensor configured to output a temperature signal indicating a temperature within the zone; and
      a smart hub configured to control the at least one heating device based on a setpoint temperature for the zone issued by the main controller and the temperature signal output by the temperature sensor of the zone system; and
   at least one pressure transmitter, each configured to detect a pressure in the supply line and output a pressure signal,
   wherein the main controller or at least one of the smart hubs deactivates one or more of the heating devices when one of the at least one pressure signal drops below a threshold level.

8. The environmental control system of claim 7, wherein the at least one pressure transmitter includes at least one pressure transmitter for each zone system configured to measure a pressure in the supply line to the at least one heating device of the zone.

9. The environmental control system of claim 8, wherein the at least one pressure transmitter includes a pressure transmitter for each heating device configured to measure a pressure in the supply line to the heating device.

10. The environmental control system of claim 7, further comprising a gas meter configured to output a flow rate signal indicating a flow rate of the gas from the source to the plurality of zone systems.

11. The environmental control system of claim 10, wherein:
   the main controller is configured to obtain an expected flow rate based on the heating devices that are activated and/or an outdoor temperature;
   compare the flow rate to the expected flow rate; and
   trigger an alarm and/or issue a notification to an administrator of the environmental control system when the flow rate exceeds the expected flow rate.

12. The environmental control system of claim 11, wherein the main controller obtains the expected flow rate using a mapping stored in memory of the system.

13. A method of controlling environmental conditions of an open interior of an agricultural building using an environmental control system, which includes:
   a source of combustible gas;
   a main controller;

a plurality of zone systems, each configured to control environmental conditions within one of a plurality of zones within the open interior, each zone system comprising:
at least one heating device connected to the source of combustible gas through a supply line, and configured to generate heat by burning the combustible gas when activated;
a temperature sensor configured to output a temperature signal indicating a temperature within the zone; and
a smart hub; and
at least one pressure transmitter;
the method comprising:
controlling the at least one heating device of each zone system based on a corresponding setpoint temperature issued by the main controller and the temperature signal output by the temperature sensor of the zone system;
detecting a pressure in the supply line using the pressure transmitter; and
deactivating one or more of the heating devices when the detected pressure drops below a threshold level using the main controller or one of the smart hubs.

14. The method of claim 13, wherein:
the at least one pressure transmitter includes at least one pressure transmitter for each zone system configured to measure a pressure in the supply line to the at least one heating device of the zone; or
the at least one pressure transmitter includes a pressure transmitter for each heating device configured to measure a pressure in the supply line to the heating device.

15. The method of claim 13, wherein:
the system includes a gas meter configured to output a flow rate signal indicating a flow rate of the gas from the source to the plurality of zone systems; and
the method comprises outputting a flow rate signal indicating a flow rate of the gas from the source to the plurality of zone systems using a gas meter.

16. The method of claim 15, further comprising:
obtaining an expected flow rate based on the heating devices that are activated and/or an outdoor temperature using the main controller;
comparing the flow rate to the expected flow rate using the main controller; and
triggering an alarm and/or issuing a notification to an administrator of the environmental control system when the flow rate exceeds the expected flow rate.

17. An environmental control system for controlling environmental conditions of an open interior of an agricultural building, the system comprising:
a main controller; and
a plurality of zone systems, each configured to control environmental conditions within one of a plurality of zones within the open interior, each zone system comprising:
a plurality of environmental control devices, each configured to control an environmental condition within the zone;
a plurality of sensors, each configured to detect an environmental condition within the zone; and
a smart hub configured to control the at least one environmental control device based on one or more parameters received from the main controller and the at least one sensor, the smart hub including:
a plurality of input ports, each coupled to one of the sensors; and
a plurality of input/output ports, each coupled to one of the environmental control devices; and
a communication link between the main controller and each of the smart hubs, through which status information on each of the plurality of environmental control devices is communicated, the status information on each environmental control device includes an identification of the environmental control device and a condition of the environmental control device.

18. The environmental control system of claim 17, wherein the communication link comprises a two-wire communication link and the status information is communicated over the two-wire communication link using voltage pulses.

19. The environmental control system of claim 18, wherein the status information for each environmental control device includes a continuous voltage signal indicating a normal condition of the environmental control device, and a pulsed voltage signal indicating a malfunction of the environmental control device.

20. The environmental control system of claim 17, wherein the identification for each environmental control device is based on the input/output port of the smart hub to which the environmental control device is connected.

21. The environmental control system of claim 17, wherein:
the plurality of environmental control devices includes a zone heater; and
the status information indicates any one of a normal operating condition; an air pressure failure; a flame detected out of sequence; an ignition failure; and a control failure.

22. The environmental control system of claim 17, wherein:
the plurality of environmental control devices includes a brooder heater; and
the status information indicates any one of a normal operating condition; a flame detected out of sequence; an ignition failure; and a control failure.

23. The environmental control system of claim 17, wherein the main controller is configured to initiate status checks on the environmental control devices in each of the zones, and each smart hub communicates the status information in response to each status check.

24. The environmental control system of claim 17, wherein each smart hub communicates the status information to the main controller on a predetermine schedule.

25. The environmental control system of claim 17, wherein the main controller is configured to trigger an alarm and/or issue a notification to an administrator of the environmental control system in response to the status information indicating a fault condition of one of the environmental control devices.

26. The environmental control system of claim 25, wherein the main controller is configured to issue the notification, which comprises a text message or an email that identifies at least one of the zone system or zone in which the environmental device having the fault condition is located, and an identification of the environmental device having the fault condition, based on the status information corresponding to the environmental control device having the fault condition.

27. A method of operating an environmental control system for controlling environmental conditions of an open interior of an agricultural building, the system comprising:
a main controller; and a plurality of zone systems, each configured to control environmental conditions within one of a plurality of zones within the open interior, each zone system comprising:
  a plurality of environmental control devices;
  a plurality of sensors; and
  a smart hub; and
a communication link between the main controller and each of the smart hubs;
the method comprising:
  controlling environmental conditions within each zone using the corresponding zone system comprising:
    receiving one or more setpoint parameters from the main controller for the zone using the smart hub;
    detecting environmental conditions within the zone using the sensors; and
    controlling the environmental control devices based on the setpoint parameters and the detected environmental conditions using the smart hub; and
  communicating status information on each of the plurality of environmental control devices of each zone system to the main controller over the communication link using the smart hubs, wherein the status information on each environmental control device includes an identification of the environmental control device and a condition of the environmental control device.

28. The method of claim 27, wherein communicating the status information comprises generating voltage pulse signals over a two-wire communications link using the smart hubs, including continuous voltage signal indicating a normal operating condition of one of the environmental control devices, and a pulsed voltage signal indicating a fault condition of one of the environmental control devices.

29. The method of claim 27, wherein the identification for each environmental control device is based on the input/output port of the smart hub to which the environmental control device is connected.

30. The method of claim 27, wherein:
  the plurality of environmental control devices includes a zone heater; and
  the status information indicates any one of a normal operating condition; an air pressure failure; a flame detected out of sequence; an ignition failure; and a control failure.

31. The method of claim 27, wherein:
  the plurality of environmental control devices includes a brooder heater; and
  the status information indicates any one of a normal operating condition; a flame detected out of sequence; an ignition failure; and a control failure.

32. The method of claim 27, further comprising triggering an alarm and/or issuing a notification to an administrator of the environmental control system in response to the status information indicating a fault condition of one of the environmental control devices using the main controller.

33. The method of claim 32, wherein the method comprises issuing the notification, which comprises a text message or an email that identifies at least one of the zone system or zone in which the environmental device having the fault condition is located, and an identification of the environmental device having the fault condition, based on the status information corresponding to the environmental control device having the fault condition.

34. A zone system of an environmental control system for controlling environmental conditions of a zone within an open interior of an agricultural building, the zone system comprising:
  a heating device;
  a plurality of temperature sensors, each temperature sensor configured to output a temperature signal indicating a sensed temperature; and
  a smart hub including:
    a first operating mode, in which the smart hub controls the heating device based on the temperature signals received from a first subset of the temperature sensors; and
  a second operating mode, in which the smart hub controls the heating device based on the temperature signals received from a second subset of the temperature sensors that is different from the first subset,
  wherein:
    the first subset of the plurality of temperature sensors includes a first temperature sensor;
    when the smart hub receives the temperature signal from the first temperature sensor, the smart hub operates in the first operating mode; and
    when the smart hub does not receive the temperature signal from the first temperature sensor, the smart hub operates in the second operating mode.

35. The zone system of claim 34, wherein:
  the heating device is a first heating device;
  the zone system includes a first sub-zone system comprising the first heating device, the first temperature sensor, and a second temperature sensor;
  the first subset includes the first and second temperature sensors; and
  the second subset includes the second temperature sensor but not the first temperature sensor.

36. The zone system of claim 34, wherein:
  the heating device is a first heating device;
  the zone system includes a first sub-zone system comprising the first heating device and the first temperature sensor; and
  the zone system includes a second sub-zone system comprising a second heating device and a second temperature sensor.

37. The zone system of claim 36, wherein the first subset does not include the second temperature sensor, and the second subset includes the second temperature sensor but not the first temperature sensor.

38. The zone system of claim 34, wherein:
  the heating device is a first heating device;
  the zone system includes a first sub-zone system comprising:
    the first heating device;
    the first temperature sensor is configured to output a first temperature signal based on a sensed temperature; and
    a second temperature sensor configured to output a second temperature signal based on a sensed temperature;
  the zone system includes a second sub-zone system comprising:
    a second heating device; and
    a third temperature sensor configured to output a third temperature signal based on a sensed temperature, wherein the smart hub is configured to control the second heating device based on the third temperature signal;
  the first subset of temperature sensors includes the first and second temperature sensors;
  the second subset of temperature sensors includes at least one of the second and the third temperature sensor.

39. The zone system of claim 38, wherein the smart hub controls the first heating device based on an average of the first and second temperature signals when in the first operating mode.

40. The zone system of claim 39, wherein the smart hub controls the first heating device based on at least one of the second temperature signal and the third temperature signal when in the second operating mode.

41. The zone system of claim 40, wherein the smart hub controls the first heating device based on the third temperature sensor when in the second operating mode.

42. The zone system of claim 34, wherein the smart hub is configured to relay the output temperature signals or temperature values represented by the output temperature signals to a main controller.

43. A method of controlling environmental conditions within a zone of an open interior of an agricultural building using a zone system comprising:
a heating device;
a plurality of temperature sensors, each configured to output a temperature signal indicating a sensed temperature; and
a smart hub;
the method comprising:
receiving temperature signals from only a first subset of the temperature sensors;
operating the smart hub in a first operating mode including controlling the heating device based on the received temperature signals from the first subset of the temperature sensors;
receiving temperature signals from only a second subset of the temperature sensors, which is different from the first subset; and
operating the smart hub in a second operating mode including controlling the heating device based on the received temperature signals from the second subset of the temperature sensors.

44. The method of claim 43, wherein:
the first subset of the temperature sensors includes a first temperature sensor; and
the method includes:
operating the smart hub in the first operating mode when the smart hub receives the temperature signal from the first temperature sensor; and
operating the smart hub in the second operating mode when the smart hub does not receive the temperature signal from the first temperature sensor.

45. The method of claim 44, wherein:
the heating device is a first heating device;
the zone system includes a first sub-zone system comprising:
the first heating device;
the first temperature sensor is configured to output a first temperature signal based on a sensed temperature; and
a second temperature sensor configured to output a second temperature signal based on a sensed temperature;
the zone system includes a second sub-zone system comprising:
a second heating device controlled by the smart hub; and
a third temperature sensor configured to output a third temperature signal based on a sensed temperature;
the first subset of temperature sensors includes the first and second temperature sensors; and
the second subset of temperature sensors includes at least one of the second and the third temperature sensor.

46. The method of claim 45, wherein:
operating the smart hub in a first operating mode includes controlling the first heating device based on the first and second temperature signals; and
operating the smart hub in a second operating mode includes controlling the first heating device based on at least one of the second temperature signal and the third temperature signal.

47. An environmental control system for controlling environmental conditions of an open interior of an agricultural building, the system comprising:
a main controller; and
a plurality of zone systems, each zone system configured to control environmental conditions within one of a plurality of zones within the open interior, each zone system comprising:
at least one environmental control device selected from the group consisting of a heating device and an exhaust fan;
a temperature sensor configured to output a temperature signal indicating a temperature within the zone; and
a smart hub configured to control the at least one environmental control device of the corresponding zone based on a low setpoint temperature and/or a high setpoint temperature for the zone issued by the main controller and the temperature signal output by the temperature sensor of the zone,
wherein when communication between one of the zone systems and the main controller is lost, the smart hub of the zone system controls the at least one environmental control device of the zone system based on the temperature signal output by the temperature sensor of the zone system and last-received low and/or high setpoint temperatures from the main controller.

48. A method of controlling environmental conditions of an open interior of an agricultural building using an environmental control system, which includes:
a main controller; and
a plurality of zone systems, each configured to control environmental conditions within one of a plurality of zones within the open interior, each zone system comprising:
at least one environmental control device selected from the group consisting of a heating device and an exhaust fan;
a temperature sensor configured to output a temperature signal indicating a temperature within the zone; and
a smart hub;
the method comprising:
controlling an environmental parameter of each zone using the corresponding zone system comprising steps of:
periodically receiving a low setpoint temperature and/or a high setpoint temperature for the zone from the main controller using the smart hub; and
controlling the at least one environmental control device based on the temperature signal output by the temperature sensor of the zone, and in response to the received low setpoint temperature and and/or high setpoint temperature;
losing communication between a first of the zone systems and the main controller; and
controlling the at least one environmental control device of the first zone system using the smart hub of the first zone system based on the temperature signal output by the temperature sensor of the first zone system, and the low setpoint temperature and/or the high setpoint temperature received from the main controller prior to losing communication with the main controller.

\* \* \* \* \*